United States Patent [19]

Otsuka et al.

[11] 3,816,850

[45] June 11, 1974

[54] MAGNETIC RECORDING METHOD AND APPARATUS USING A MULTI-LAYER RECORDING TECHNIQUE

[75] Inventors: Hiroaki Otsuka, Tokyo; Norihisa Manabe, Saitama; Tatsuo Konishi, Tokyo, all of Japan

[73] Assignees: Nippon Hoso Kzokoi; Nippon Electric Company, Limited, both of Tokyo, Japan

[22] Filed: Nov. 9, 1972

[21] Appl. No.: 305,115

[30] Foreign Application Priority Data

Nov. 12, 1971 Japan .............................. 46-90780

[52] U.S. Cl. ...................... 360/55, 360/19, 360/57, 360/66

[51] Int. Cl. ......................... G11b 5/02, H04n 5/78

[58] Field of Search... 178/6, 6 A, 5.4 CD, 100.2 MD, 178/100.2 C, 100.2 T

[56] References Cited

UNITED STATES PATENTS

| | | | |
|---|---|---|---|
| 3,278,678 | 10/1966 | Rank | 178/6.6 A |
| 3,283,085 | 11/1966 | Lemke | 178/6.6 A |
| 3,542,946 | 11/1970 | Warren | 178/6.6 A |

*Primary Examiner*—Raymond F. Cardillo, Jr.
*Attorney, Agent, or Firm*—Sandoe, Hopgood & Calimafde

[57] ABSTRACT

According to this multi-layer recording technique, a relatively low-frequency signal track is recorded on a magnetic tape in the direction of the tape's motion. A plurality of second relatively high-frequency tracks are recorded by one or more magnetic heads. The gap of the head or heads forms an acute angle with the second tracks such that sine component of the gap with respect to that angle is an integral multiple of the pitch of the second tracks.

8 Claims, 4 Drawing Figures

MAGNETIC RECORDING METHOD AND APPARATUS USING A MULTI-LAYER RECORDING TECHNIQUE

BACKGROUND OF THE INVENTION:

This invention relates to a magnetic video signal recording system in which a video signal is recorded across other recorded tracks produced by low frequency signals, such as audio signals or control signals, on a magnetic tape.

In a magnetic recording and/or reproducing system such as a four-head video tape recorder (VTR), a video signal is recorded on a 2-inch wide magnetic tape by four heads mounted in quadrature relationship on a rotatable disc driven by a head motor at a nominal speed of 240 Hz (14,400 rpm). The magnetic tape for the four-head VTR is normally about 36 microns thick, 26 microns for the polyester base and 10 microns for the magnetic coating. The video signal recorded on the magnetic tape is normally of high frequency. Therefore, the recorded wavelength on the magnetic tape is short. As a result, the video track formed in the magnetic coating is very shallow, leaving the deeper region of the magnetic coating unused. The video track is generally considered to be less than 1 micron in depth.

In order to efficiently utilize the deeper region of the tape, a multi-layer magnetic recording system has been proposed, in which a low frequency signal such as an audio signal having a relatively long recorded wavelength on the magnetic tape is recorded first so as to form a low-frequency-signal track deep within the magnetic coating, and then the video signal is recorded across the low-frequency-signal track. Such a multi-layer magnetic recording system is described in detail in Japanese Pat. No. 446,274 (Japanese Pat. Publication No.26799/1964).

However, the video signal, when recorded in superimposition on the low-frequency-signal track, erases and replaces the latter in the shallow portion of the magnetic coating, because of the saturation recording of the video signal. On reproduction by the four-head VTR, therefore, the magnetic head for scanning the low-frequency-signal track crosses over 960 video tracks per second. This causes an amplitude-modulation of the low-frequency-signal recorded by the magnetic head a trapezoidal wave of 960 Hz. The degree of the amplitude modulation depends on the low-frequency-signal wavelength on the magnetic tape and the characteristic of the video heads. Normally, the amplitude of the low-frequency-signal reproduced from the portions crossing the video track is ¾ of that reproduced from other portions thereof. This causes a characteristic aggravation in the reproduced low-frequency-signal.

It is therefore an object of this invention to provide a video magnetic recording and/or reproducing system using a multi-layer recording technique in which the reproduced low-frequency-signal is not influenced by the video tracks.

SUMMARY OF THE INVENTION

According to this invention, there is provided an improved magnetic recording and/or reproducing system in which a low-frequency signal is recorded by a stationary head first to form a low frequency signal track, and then a video signal is recorded across the low-frequency-signal track to form video tracks, said stationary head being installed slantwise at an acute angle to the low frequency track so that the gap of the stationary head is spread over an integral multiple of the pitch of the video tracks.

BRIEF DESCRIPTION OF THE DRAWINGS

The features and advantages of this invention will be clearly understood from the detailed description of a preferred embodiment taken in conjunction with the accompanying drawings, wherein.

DESCRIPTION OF THE PREFERRED EMBODIMENT

Figure 1:
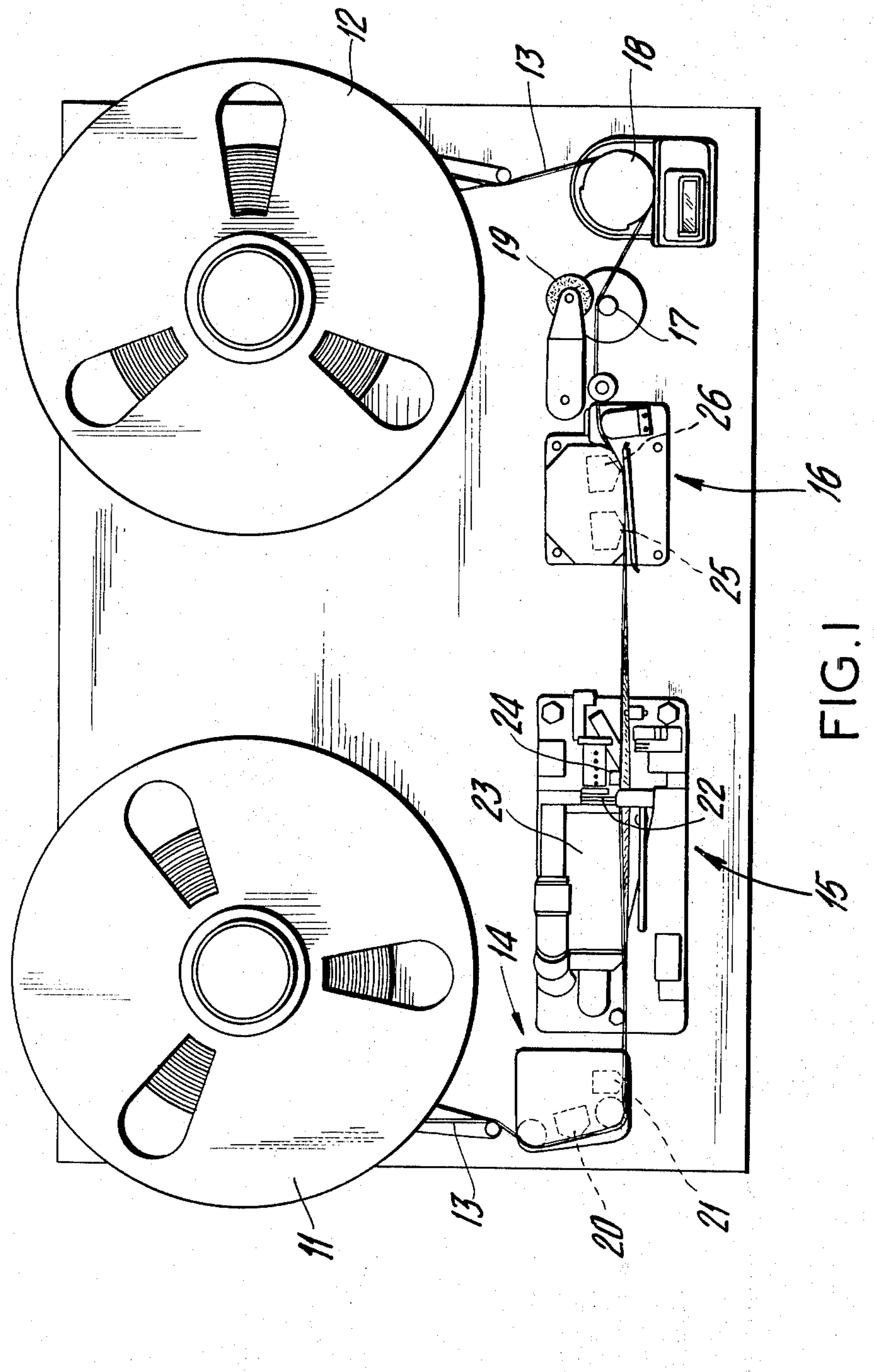
FIG. 1 is a plane view of a preferred embodiment of the apparatus of this invention.

Referring to FIG. 1, a four-head video tape recorder (VTR) comprises a supply reel 11, and a take-up reel 12. A magnetic tape 13 from the supply reel 11 is fed through a first head assembly 14, a video head assembly 15, a second head assembly 16, a capstan 17 and a tape timer 18 to the take-up reel 12 by the capstan 17 driven by a capstan motor and a pinch roller 19, at a nominal speed of 15 inches/second.

Any previously recorded and/or undesirable signal present on the magnetic tape 13 fed from the supply reel 11 is erased by an erasing head 20. Two kinds of audio signals, such as two speech signals in different languages, are recorded on the central portion of the magnetic tape 13 by a multi-layer audio head 21 having two gaps formed separately in a vertical direction, whereby two audio tracks 30 and 31 (FIG. 2) are recorded on the magnetic tape. Then, the video signal is recorded across the audio tracks 30 and 31 by four heads mounted in quadrature relationship on a rotatable disc 22 driven by a directcoupled head motor 23 at a speed of 240 revolutions per second, whereby video tracks 32 are formed across the audio tracks 30 and 31 at a rate of 960 tracks per second. The video tracks 32 are almost perpendicular to the direction of the tape transportation (The acute angle between the video tracks and the direction perpendicular to the tape transportation direction is generally 33 minutes). After the recording of the video signal is completed a control signal is recorded on the lower portion of the tape 13 by a control head 25, whereby a control track 33 is formed along the lower tape end. Then, the magnetic is passed through the second head assembly 16 in which undesired signals recorded on the portions along the upper end and the control track 33 on the magnetic tape 13 are erased by an erasing head 25 and another audio signal and a cue signal are recorded by an audio head 26, whereby another audio track 34 and a cue track 35 are formed on those portions, respectively. Then, the magnetic tape 13 is fed to the take-up reel 12 through the tape timer 18 by the capstan 17 and the pinch roller 19.

Figure 2:
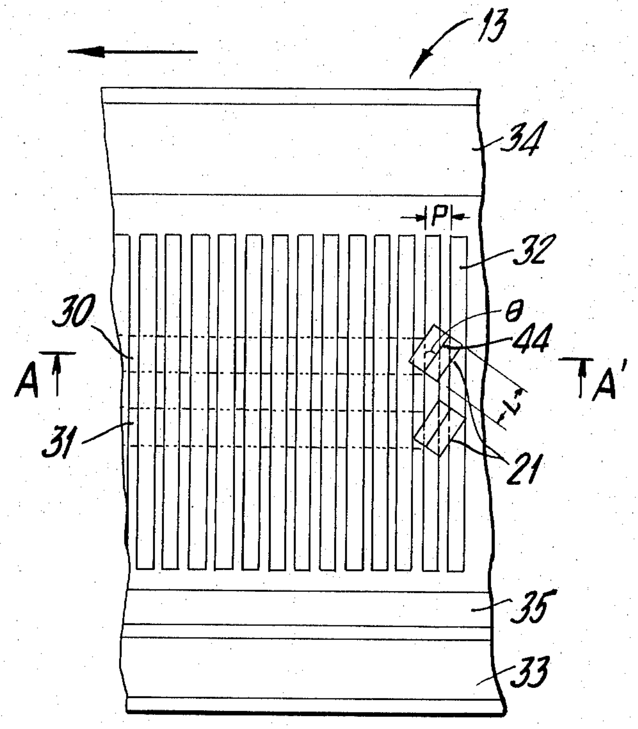
FIG. 2 is a plane view of the relationship between the recording tracks formed by the apparatus shown in FIG. 1.
Figure 3:
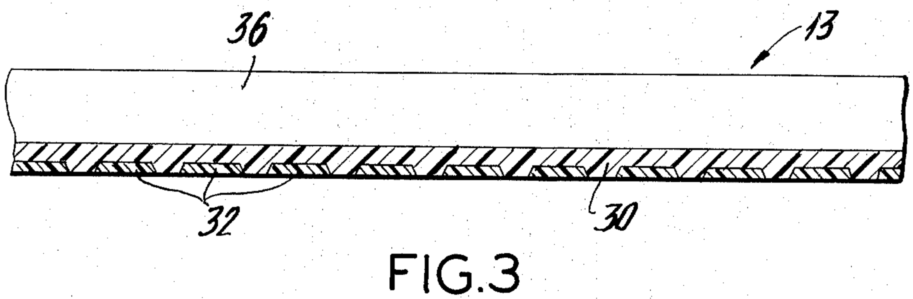
FIG. 3 shows a longitudinal cross-section of the recorded tracks shown in FIG. 2.

Thus, the recorded tape pattern or the recorded tracks shown in FIG. 2 is obtained on the magnetic tape 13. The sectional view taken along the line A-A' recorded magnetic tape is shown in FIG. 3. The magnetic tape 13 has a polyester base 36 of about 26 microns in depth and a magnetic coating of about 10 microns in depth. The magnetic coating is magnetized to its full depth by the multi-layer audio signal to form the audio track 30. The video tracks 32 formed in the audio track 30 have a depth of less than 1 micron.

Figure 4:
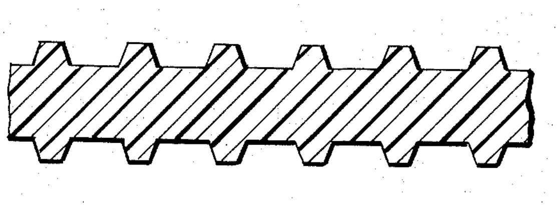
FIG. 4 shows the waveform of the reproduced signal from a conventional multi-layer magnetic recording and/or reproducing system.

In the reproduction of the recorded multi-layer audio signals, the multi-layer audio head crosses the video tracks 32 at a rate of 960 tracks per second. As a result, the reproducing multi-layer audio signals are amplitude-modulated by a trapezoidal wave of 960 Hz shown diagramatically in FIG. 4. Normally, the amplitude of the reproduced signals corresponding to the cross portion with the video track 32 is ¾ of that corresponding to the non-cross portion of the audio tracks 30 and 31.

In order to avoid the amplitude-modulation of the reproduced multi-layer audio signals, as shown in FIG. 2, the gaps 44 of the multi-layer audio head 21 are slanted slightly to form an acute angle with the video tracks 32 so that the sine component of the angle $\theta$ between the gaps and the video tracks, which is multiplied by the full length L of the gap is an integral multiple of the pitch P of the video tracks, that is, $$L \sin \theta = nP$$

$$(n = 1,2,3).$$

Thus the gap of the multi-layer audio head 21 is spread over an integral multiple of the pitch of the video tracks.

In this arrangement, the amplitude-modulation by the video tracks does not appear in thr reproduced multi-layer audio signal, with the total gap length in contact with the audio track and the total gap length in contact with the video track being kept constant. The pitch of the video tracks 32 in four-head VTR, wherein the tape transportation speed is 15 inches/sec, is about 0.4 mm.

Therefore, the angle between the video track and the gap can be chosen as small as about 5° 44'' by using the multi-layer audio head having the gap length of 4 mm and $n = 1$. It follows therefore that the angle of the gap to the direction perpendicular to the tape transportation is 5° 44'' ±33'', where 33'' is the inclination angle of the video tracks. Tis value is so small that the interference between the video track and the multi-layer audio track depending on the inclination of the multi-layer audio head can be neglected.

The embodiment with the tape speed set at 15 inches/sec. and with the gap spread over one pitch of the video tracks can be operated in one half of the tape speed, that is, 7 ½ inches/sec. In this case, the gap is spread over two pitches of the video tracks.

In the embodiment described above, the selected integer $n$ is 1, that is, the gap is spread over one pitch of the video tracks 32. Instead, integer $n$ may be selected to 2,3,4 . . . , that is, the gap length may be spread over an integral multiple of the pitch. However, it is undesirable to increase the inclination angle of the multi-layer audio head in view of the manufacture of the multi-layer audio head and of the interference between the video and audio tracks.

What is claimed is:

1. A magnetic recording apparatus comprising:

first means for recording a relatively low frequency signal on a magnetic tape in the direction in which the tape is transported so as to form a first recorded track thereon;

second means for recording a relatively high frequency signal on said magnetic tape in a direction traversing said first recorded track to form a plurality of second recorded tracks thereon;

said first means defining a gap which forms an acute angle with said second tracks such that the sine component of said acute angle multiplied by the length of said gap is an integral multiple of the pitch of said second tracks.

2. The apparatus of claim 1 further comprising:

third means for scanning said first recorded tracks; and fourth means for scanning said second recorded tracks;

said third means defining a gap which forms an acute angle with said second tracks such that the sine component of said acute angle multiplied by the length of said gap is an integral multiple of the pitch of said second tracks.

3. The apparatus of claim 1, wherein said relatively high frequency signal is a video signal, sand said second recording means comprises four heads mounted in quadrature relationship on a rotatable disc.

4. The apparatus of claim 3, wherein said first recording means comprises a plurality of magnetic heads for recording a plurality of audio signals containing speech in different languages.

5. A method of recording signals on a magnetic tape comprising:

recording a relatively low frequency signal on said magnetic tape by passing along the tape a recording head defining a gap so as to form a first track thereon; and recording a relatively high frequency signal on said tape in a direction traversing said first track to form a plurality of second recorded tracks thereon, said gap forming an acute angle with respect to the second tracks such that the sine component of the said acute angle multiplied by the length of said gap is an integral multiple of the pitch of said second tracks.

6. The method of claim 5, wherein said relatively high frequency signal is a video signal and is recorded by rotating four heads in quadrature relationship to each other.

7. The method of claim 6, wherein said low frequency signal is an audio signal.

8. The method of claim 6, wherein said low frequency signal includes a plurality of speech signals in different languages, each speech signal being recorded by a different magnetic head.

* * * * *

UNITED STATES PATENT OFFICE

CERTIFICATE OF CORRECTION

Patent No. 3,816,850 Dated June 11, 1974

Inventor(s) H. Otsuka et al

It is certified that error appears in the above-identified patent and that said Letters Patent are hereby corrected as shown below:

IN THE CAPTION:

The assignee "Nippon Hoso Kzokoi" should be --Nippon Hoso Kyokai--

IN THE CLAIMS:

In Claim 3, column 4, line 30, before "said" "sand" should be --and--.

Signed and sealed this 1st day of October 1974.

(SEAL)
Attest:

McCOY M. GIBSON JR.
Attesting Officer

C. MARSHALL DANN
Commissioner of Patents